United States Patent [19]

Kuwabara et al.

[11] Patent Number: 4,822,542

[45] Date of Patent: Apr. 18, 1989

[54] METHOD OF PRODUCTION OF EXPANSION-MOLDED ARTICLE, FROM FOAMABLE THERMOPLASTIC RESIN PARTICLES AND APPARATUS THEREFOR

[75] Inventors: Hedeki Kuwabara, Hadano; Atusi Kitagawa, Fujisawa; Masato Kanbe, Hiratsuka, all of Japan

[73] Assignee: Japan Styrene Paper Corporation, Tokyo, Japan

[21] Appl. No.: 76,753

[22] Filed: Jul. 23, 1987

Related U.S. Application Data

[63] Continuation-in-part of Ser. No. 703,301, Feb. 21, 1985, abandoned.

[51] Int. Cl.[4] .......................... C08J 9/22; B29C 67/22
[52] U.S. Cl. ........................................ 264/50; 264/37; 264/40.3; 264/40.4; 264/53; 264/85; 264/DIG. 5; 264/DIG. 9; 264/DIG. 10; 264/DIG. 15; 425/4 R; 425/140; 425/146; 425/149

[58] Field of Search ............... 264/51, 53, 50, DIG 5, 264/DIG 9, DIG 10, 85, DIG 15, 37, 40.3, 40.4; 425/4 R, 140, 146, 149

[56] References Cited

U.S. PATENT DOCUMENTS

| | | | |
|---|---|---|---|
| 3,013,966 | 12/1961 | Pollard et al. | 264/DIG. 15 |
| 3,126,432 | 3/1964 | Schuur | 264/DIG. 15 |
| 3,953,558 | 4/1976 | Hatano et al. | 264/50 X |
| 3,988,404 | 10/1976 | Orimo et al. | 264/50 X |
| 4,032,609 | 6/1977 | Smith | 264/53 |
| 4,440,703 | 4/1984 | Akiyama et al. | 264/50 |
| 4,443,393 | 4/1984 | Akiyama et al. | 264/53 |

Primary Examiner—Philip Anderson
Attorney, Agent, or Firm—Sherman & Shalloway

[57] ABSTRACT

This invention relates to a method and apparatus for improving not only the quality of the production of molded foamable thermoplastic resin particles converted into fusion-bonded materials but also the output by protecting the resin from atmospheric pressure by pressurizing the particles and heating the particles to soften the same.

18 Claims, 8 Drawing Sheets

METHOD OF PRODUCTION OF EXPANSION-MOLDED ARTICLE, FROM FOAMABLE THERMOPLASTIC RESIN PARTICLES AND APPARATUS THEREFOR

This is a continuation-in-part of prior application Ser. No. 703,301, filed Feb. 21, 1985, and now abandoned.

This invention relates to a method of converting pre-foamed particles composed of thermoplastic resins into expansion-molded articles and an apparatus for performing this method.

The prior art production of an expansion-molded article through expansion molding of pre-foamed particles of a thermoplastic resin in a mold, has previously been arranged by feeding a predetermined portion (for example, an amount required for several molding operations) of pre-foamed particles which have in advance been subject to a pressure treatment in a pressurizing tank and subjected to an internal pressure, to a hopper; to take out a portion of the thus-fed pre-foamed particles, which portion is required for a single molding operation, from the hopper and to move the particles into a mold to perform the molding. In conventional production methods and apparatus, pre-foamed particles are left exposed to atmospheric pressure in each hopper. Accordingly, the internal pressure of the pre-foamed particles decreases along with the time of their exposure to atmospheric pressure in the hopper. This leads to the drawback that the resulting expansion molded articles develop large dimensional variations. The drop of internal pressure becomes more remarkable in the case of pre-foamed particles having diameters below 10 mm. Such a significant drop of internal pressure results in an insufficient forming expansion force, resulting in drawbacks such as melt-bonding of particles being poor, severe ruggedness on the surfaces of each molded article or each article is molded with a large shrinkage factor.

Furthermore, due to the structure of the hopper which is exposed to the atmosphere, there is another drawback that when a predetermined amount of pre-foamed particles is fed from the hopper to the mold for performing the molding operation, it is difficult to transfer the particles smoothly and promptly from the hopper to the mold.

The present invention is directed to overcome the above-mentioned drawbacks.

An object of this invention is therefore to provide a production method of an expansion-molded article of a thermoplastic resin, in which pre-foamed particles have been subjected to an internal pressure, and are kept under pressure through all subsequent stages so as to avoid drop of internal pressure of the particles.

Another object of the invention is to provide a production method for forming expansion-molded articles from pre-foamed particles of a thermoplastic resin in which the filling of the pre-foamed particles in a mold is performed in the presence of a pressurizing agent while minimizing the compression of the particles so that their expansion efficiency is increased.

A further object of this invention is to provide an apparatus suitable for use in the production of expansion molded articles of a thermoplastic resin, in which pre-foamed particles, to which an internal pressure has in advance been applied, are moved into a mold and then subjected to expansion molding while holding the pre-foamed particles under pressure.

In one aspect of the invention, a method is provided for producing an expansion molded article of a thermoplastic resin which comprises:

transferring a suitable portion of pre-foamed particles of a thermoplastic resin, kept under a pressure in a pressurizng tank, into a pressurizing hopper while maintaining the particles under pressure; and transferring under pressure a predetermined amount of the pre-foamed particles from the pressurizing hooped into a mold; and heating the thus filled pre-foamed particles within the mold so as to cause the pre-foamed particles to foam and expand, thereby fushion-bonding the resulting expanded article to obtain the expansion molded particles.

In another aspect of this invention, there is also provided an apparatus suitable for use in the production of an expansion-molded article of a thermoplastic resin, which comprises:

a pressurizing tank having an internal volume sufficient to keep pre-foamed particles of a thermoplastic resin therein and including a particle outlet;

a pressure feed system for pressurizing the interior of the pressurizing tank so as to apply a predetermined internal pressure to the particles;

a pressurizing hopper including a particle inlet and at least one particle outlet and adapted to hold a suitable portion of the particles, which suitable portion has been transferred from the pressurizing tank, and then to feed a predetermined amount of particles into a mold for molding the agent expansion-molded article;

a gate mechanism for openably closing the particle outlet of the pressurizing hopper;

particle transfer means for causing, while maintaining the suitable portion of the particles in the pressurized state, the suitable portion of the particles to flow out from the pressurizing tank through the particle outlet and then to enter the pressurizing hopper through the particle inlet thereof;

at least one molding machine equipped with a molding compartment, in which the particles are to be filled, and heating means for heating the thus-filled particles to cause the thus-filled particles to expand; and a particle filling system for causing the particles to move through the outlet of the pressurizing hopper into the molding compartment through a particle filling opening, while maintaining the particles in the pressurized state.

According to this invention, the pre-foamed particles which have in advance been pressurized in the pressurizing tank are transferred by the particle transfer means to the pressurizing hopper while maintaining them in their pressurized state. In the pressurizing hopper, they are also held under pressure. Pre-foam particles are transferred from the tank to the pressurized hopper. The temperature in the pressurizing tank and the pressurizing hopper will not adversely affect the benefits obtained by the present invention.

Thereafter, the particles are moved from the pressurizing hopper into the molding compartment of the molding machine by a particle filling system while maintaining them in their pressurized state. Therefore, the particles which have moved out of the pressurizing tank are always kept under pressure until they filled in the molding compartment.

In the present invention, the particles are thus not exposed to atmospheric pressure during the entire operating cycle upon producing an expansion-molded article from the pre-foamed particles. This avoids a drop of internal pressure of the particles after their pressure treatment and until their molding. As a result, even when particles fed from the pressurizing tank are molded in several portions, no dimensional variations will be developed among the resulting products despite the passage of time of the molding cycle, thereby bringing about an advantageous effect that uniform products can be obtained. Since it is also possible to avoid drop of internal pressure of particles as mentioned above, the present invention has resulted into another advantageous effect, namely that particles can be readily and completely melt-bonded to form high-quality molded articles having smooth surfaces.

The apparatus of this invention has particle transfer means capable of transferring particles while maintaining them in their pressurized state and a particle filling system capable of filling the particles in a mold while maintaining them in their pressurized state. Accordingly, the transfer of the particles can be carried out smoothly and promptly after moving them from the pressurizing tank into the mold. This enables to shorten the time of molding cycle and hence to increase the production efficiency significantly.

Furthermore, the apparatus of this invention is equipped with the pressurizing hopper. The provision of the pressurizing hopper allows the moving of any amount of particles required for a molding operation, from the pressurizing tank before their actual molding, thereby bringing about a further advantageous effect that the molding operation can be conducted more efficiently.

In a preferred embodiment of this invention, particles may be filled under pressure in the mold while leaving a cracking in the mold. In this case, the particles are not compressed when filled in the mold. This means that the particles can be filled in the mold without substantially reducing the volumes of the particles. As a result, it is possible to produce a molded article having a higher extent of foaming than those available by a molding method of the compression filling type. Accordingly, a production method featuring excellent foaming efficiency can be provided as a further advantageous effect of this invention.

The above and other objects, features and advantages of the present invention will become apparent from the following description and the appended claims, taken in conjunction with the accompanying drawings, in which:

As pre-foamed particles of thermoplastic resins which are useful in the practice of this invention, may be mentioned pre-foamed particles made of such base resins as styrene-base resin, ester-base resins and the like. Particularly great practical advantages may be obtained with pre-foamed particles having a large gas permeability and making use as a base resin of an olefin resin such as polypropylene, low density polyethylene, high density polyethylene, straight-chain low density polyethylene, an ethylene-propylene random copolymer, an ethylene-propylene block copolymer, an ethylene-vinyl acetate copolymer or the like.

Pre-foamed particles may be prepared by any suitable method known per se in the art. Where an olefin resin such as polyethylene, polypropylene, an ethylene-propylene copolymer or the like is used as a base resin for such pre-foamed particles, it is particularly advantageous to heat and soften the particles of such an olefin resin and then to impregnate the thus softened particles with a volatile foaming agent such as butane, propane, dichloro-difluoromethane or the like and/or an inorganic foaming agent such as carbon dioxide or the like in a closed vessel, and thereafter to release the thus-impregnated particles into a pressure lower than the internal pressure of the vessel.

Upon molding, an internal pressure is applied to pre-foamed particles. This application of internal pressure may be effected by subjecting the pre-foamed particles to a pressure treatment by means of an inorganic gas such as air or carbon dioxide or a mixed gas of an inorganic gas and the above-described volatile foaming agent. It is however preferred to effect the pressure treatment with air so that internal pressures are built-up in the pre-foamed particles. The pressure treatment, which is intended to apply an internal pressure to pre-foamed particles, may be carried out in the pressurization tank of the apparatus according to this invention. Alternatively, it may also be effected as a separate step.

Referring first to FIG. 1 to FIG. 7, description will be made on a production apparatus according to one embodiment of this invention and various steps for producing an expansion-molded article by means of the production apparatus.

Figure 1:
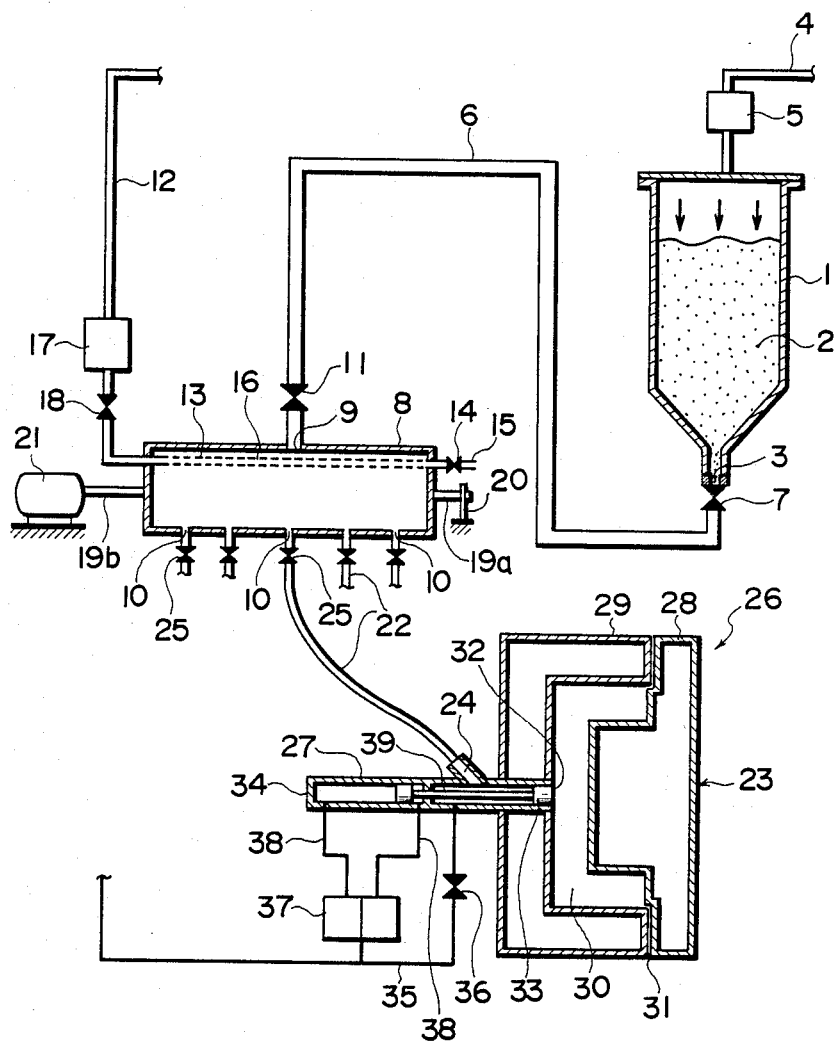
FIG. 1 is a simplified schematic vertical cross-sectional view of an apparatus according to one embodiment of this invention.

In FIG. 1, numeral 1 indicates a pressurizing tank having an internal volume sufficient to keep pre-foamed articles 2 of a thermoplastic resin therein and including a particle outlet 3. A pressurizing gas is fed to the pressurizing tank 1. As the pressurizing gas, an inorganic gas such as air or carbon dioxide, a mixed gas of an inorganic gas and a volatile foaming agent such as butane, propane or dichlorodifluoromethane or the like may be used. In the present embodiment, description will be made using air as the pressurizing gas.

Into the pressurizing tank 1, air is introduced by means of a pressure feed system which is composed of an air tank (not shown) and a compressed air feed-line 4 connected to the air tank whereby to pressurize the interior of the tank 1. Owing to this pressurizing with air, a pre-determined internal pressure is applied to the particles 2 in the pressurizing tank 1.

A pressurization regulator 5 is coupled to the compressed air feed line 4 and serves to control the pressure of the compressed air, which is to be fed to the pressurizing tank through the feed line 4, to a prescribed level.

If desired or necessary, the regulator 5 may be provided with a function by which the pressure-raising velocity in the pressurizng tank 1 is controlled.

A particle feed line 6 is connected to the particle outlet 3 of the pressurizing tank 1. Numeral 7 indicates a gate valve for the particle outlet 3.

Numeral 8 is a pressurizing hopper which is disposed for example with its longitudinal axis extending horizontally. Similar to the pressurizing tank 1, the pressurizing hopper 8 is constructed as a closed vessel and is equipped with a particle inlet 9 in the upper wall thereof and particle outlets 10 in the lower wall thereof. The number of the particle outlets 10 is determined suitably depending on the number of filling devices of a molding machine which will be described herein. Thus, one or more particle outlets may be provided.

A particle feed line 6 is connected to the particle inlet 9 so that a suitable portion of the pre-foamed particles 2 can be fed from the pressurizing tank 1 to the pressurizing hopper 8 while maintaining them under pressure. Numeral 11 indicates a gate valve for the particle inlet 9.

Figure 8:
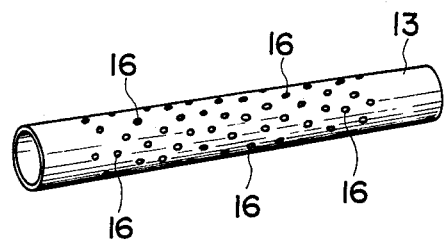
FIG. 8 is a perspective view of a perforated pipe.

In order to keep the pre-foamed particles, which have been received in the pressurizing hopper 8, in a good pressurized state, a compressed air feed line 12 is connected to the pressurizing hopper 8. The feed line 12 is coupled to a perforated pipe 13 which is arranged within the pressurizing hopper 8. The perforated pipe 13 is in turn connected to an exhaust line 15 equipped with an exhaust valve 14. As illustrated in FIG. 8, the perforated pipe 13 defines a number of minute perforations 16 through the circumferential wall thereof. The size of these minute perforations 16 may preferably be 40 mesh or greater in order to prevent pre-foamed particles and resin powder, which comes off from the surfaces of such pre-foamed particles, from entering the perfoated pipe 13 through the minute perforations 16. The compressed air feed line 12 may be constructed in communication either with the compressed air feed line 4 connected to the pressurizing tank 1 or with an independent air tank. Numeral 17 indicates a pressurization regulator serving to control the pressure of the compressed air to be fed to the pressurizing hopper 8 at a prescribed level, while numeral 18 is a pressurizing valve.

As means for pressurizing the interior of the pressurizing hopper 8, compressed air may be fed to the pressurizing hopper 8 by way of the particle transfer line 6 instead of providing the compressed air feed line 12 as described above.

The pressurizing hopper 8 may be provided fixedly. Alternatively, it may also be provided turnably so that after completion of filing of pre-foamed particles in a mold, any remaining pre-foamed particles may be recycled smoothly to the pressurizing hopper 8. As this turnable structure, a variety of structures may be contemplated. According to the structure shown by way of example in FIG. 1, support shafts 19a, 19b are provided with their corresponding end walls of the pressurizing tank 8. One of the support shafts, namely, the support shaft 19a is turnably supported on a support frame 20, whereas the other support shaft, i.e., the support shaft 19b is coupled to a rotary cylinder 21, whereby rotating the support shaft 19b and in turn the pressurizing hopper 8.

To the particle outlet 10 of the pressurizing hopper 8, one end of a particle feed line 22 is connected. The other end of the feed line 22 is connected to a particle feed opening 24 of a molding machine 23. Therefore, an amount of the pre-foamed particles 2 which amount is required for a single molding operation can be fed from the pressurizing hopper 8 to the molding machine 23 while maintaining them in their pressurized state. Designated as numeral 25 is a gate valve for the particle outlet 10.

The molding machine 23 is equipped with a mold 26 and filling device 27. The mold 26 is composed of a movable core 28 and a fixedly-installed cavity 29. When both mold halves are closed, a molding compartment 30 is formed. Between the mutually-contacting portions of the core 28 and cavity 29, a crack 31 may be provided as an air vent. On the other hand, the filling device 27 is equipped with a particle filling opening which opens in the surface of the cavity 29, a valve member 33 adapted to closably communicate the particle feed opening 24 with the particle filling opening 32, and an air cylinder 34 adapted to shift the valve member 33. There are also illustrated a compressed air feed line 35 for feeding and filling pre-foamed particles, which have been introduced to the particle feed opening 24 through the particle feed line 22 from the pressurizing hopper 8, into the molding compartment 30 by way of the particle filling opening 32, a filling air valve 36 provided with the feed line 35, and a directional control valve 37 adapted to change the feeding direction of air to the air cylinder 34. Although feed lines 38 are connected to the compressed air feed line 35 in the illustrated embodiment, they may be separated from the feed line 35 and instead, may be supplied with air from an independent compressor. The compressed air feed line 35 may be connected with the compressed air feed line 4 for the pressurizing tank 1. Alternatively, the compressed air feed line 35 may be provided without connecting it with the feed line 4 and instead, may take such as structure as receiving compressed air from an independent source.

The operation of the above-described production apparatus of this invention will next be described.

In FIG. 1, the gate valve 7 for opening and closing the particle outlet 3 of the pressurizing tank 1, the gate valve 11 for opening and closing the particle inlet 9 of the pressurizing hopper 8 and the gate valve 25 for opening and closing the particle outlet 10 of the pressurizing hopper 8 as well as the pressurizing valve 18, exhaust valve 14 and filling air valve 36 are all in their closed state. Owing to compressed air fed to the pressurizing tank 1, the interior of the pressurizing tank 1 is pressurized to apply a predetermined internal pressure to the pre-foamed particles 2. The pressure of the interior of the pressurizing tank 1 is maintained at a predetermined level by means of the regulator 5. The interior pressure of the pressurizing tank 1 may be 0.2-20 kg/cm$^2$(G) or preferably 0.5-10 kg/cm$^2$(G).

The regulator 5 may be provided with a function which controls the pressure-raising velocity in the pressurizing tank 1. Provision of such a function has the merit that the particles 2 may be pressurized little by little and the application of an internal pressure to the particles 2 may be carried out better depending on the type of their base resin. Namely, the pressure may first be kept rather low in the pressurizing tank 1. Making use of the above-mentioned controlling function of the regulator 5, the interior pressure of the pressurizing tank 1 is than raised little by little to reach an intended pressure level over a predetermined period of time. When particles are pressurized gradually as mentioned above, there is less danger of particle compression compared with a situation under which particles are abruptly pressurized to the determined pressure from the beginning. Hence, the predetermined internal pressure can be applied efficiently to the particles 2. When effecting the pressurization gradually in the above manner, it is preferred to control the pressure-raising velocity within 0.015–0.5 kg/cm$^2$(G)/hr. until the interior of the pressurizing tank 1 is pressurized to the above-described pressure level.

Figure 2:
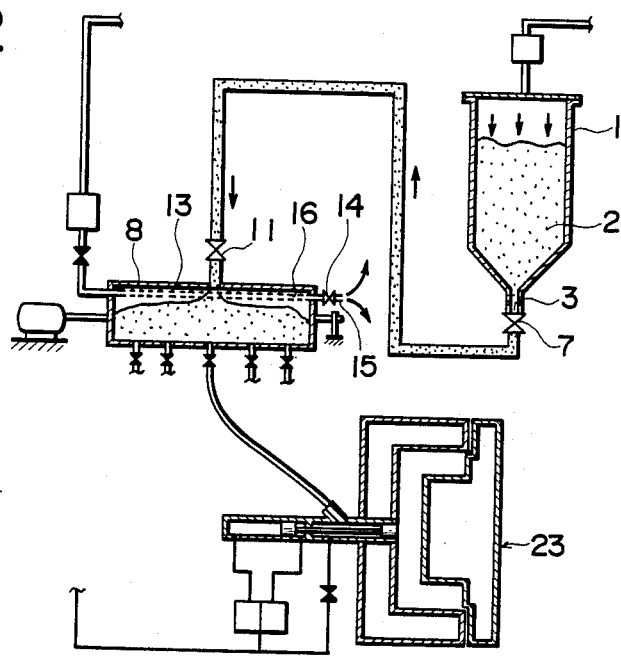
FIGS. 2-7 are simplified schematic vertical cross-sectional views illustrating various steps for producing an expansion-molded article by means of the apparatus shown in FIG. 1.
Figure 3:
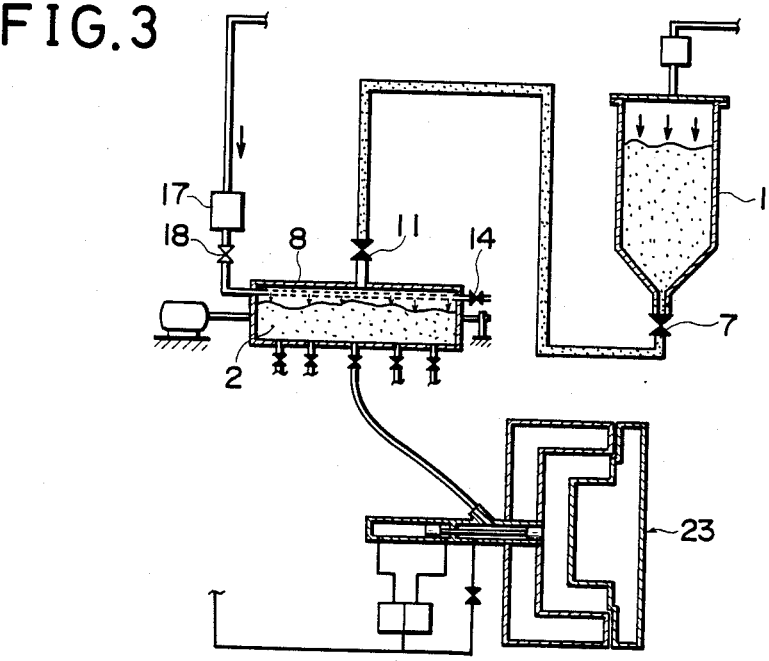
Figure 4:
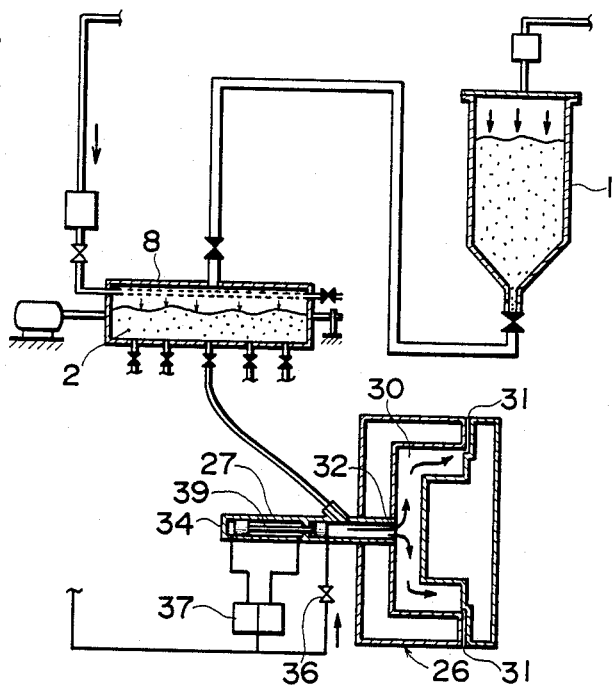
Figure 5:
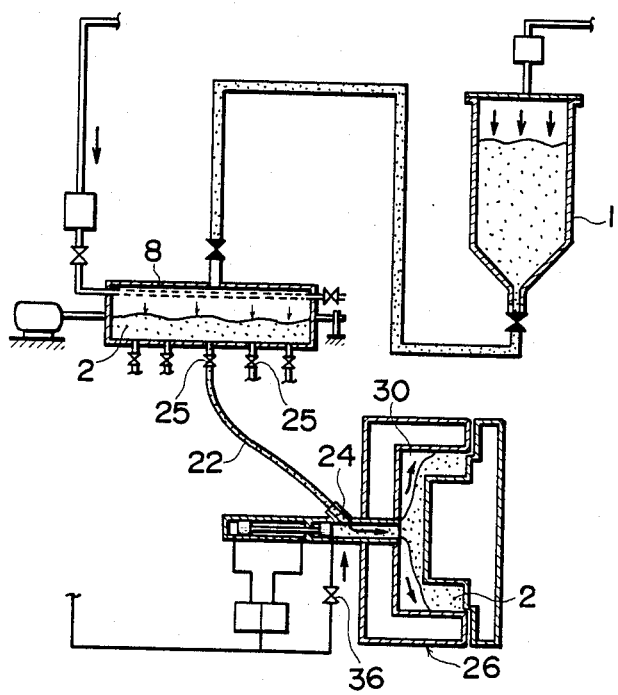

A suitable portion (for example, an amount necessary for several molding operations) of the pre-foamed particles 2, which have been kept under pressure in the pressurizing tank 1, is thereafter transferred to the pressurizing hopper 8. Upon effecting this transfer, the gate valve 7, gate valve 11 and exhaust valve 14 are all opened as depicted in FIG. 2. Thus, the suitable portion of the pre-foamed particles 2 is pushed out of the pressurizing tank 1 owing to the interior pressure of the pressurizing tank 1 and is then transferred to the pressurizing hopper 8. The air in the pressurizing hopper 8 is in turn caused to flow through the minute perforations 16 of the perforated pipe 13 and is then exhausted via the exhaust line 15.

When the suitable portion of the pre-foamed particles has been transferred from the pressurizing tank 1 to the pressurizing hopper 8, the gate valve 7, gate valve 11 and exhaust valve 14 are closed and the pressurizing valve 18 is instead opened, whereby feeding compressed air into the pressurizing hopper 8 to pressurize the pre-foamed particles 2 (see, FIG. 8). The interior pressure of the pressurizing hopper 8 is maintained at a predetermined level by the regulator 17. The interior pressure of the pressurizing hopper 8 may be 0.2–20 kg/cm$^2$(G) or preferably 0.5–10 kg/cm$^2$(G). The interior pressure of the pressurizing hopper 8 may be set at a level either equal to or higher than the interior pressure of the pressurizing tank 1. In the latter case, it may be preferred to set the interior pressure of the pressurizing hopper 8 at a level 0.01–1.0 kg/cm$^2$ higher than the interior pressure of the pressurizing tank 1.

While the pre-foamed particles 2 are held under pressure within the pressurizing hopper 8, the directional control valve 37 is changed over to cause the piston rod 39 of the air cylinder 34 to retreat. Therefore, the particle filling opening 32 of the mold 26 is opened and at the same time, the filling air valve 36 is also opened so as to feed compressed air into the molding compartment 30 of the mold 26 and to discharge water and the like, which are deposited in the molding chamber 30, along with air through the gap 31 (see, FIG. 4).

The gate valve 25 for the particle outlet 10 of the pressurizing hopper 8 is then opened to push out the pre-foamed particles 2 by the interior pressure of the pressurizing hopper 8 from the pressurizing hopper 8. The pre-foamed particles 2 thereafter flow through the particle feed line 22 into the particle feed opening 24 of the filling device, followed by their further flow to the molding compartment 30 of the mold 26 by the compressed air supplied through the filling air valve 36 (see, FIG. 5). Where the interior pressure of the pressurizing hopper 8 is set at a level higher than the interior pressure of the pressurizing tank 1, it is possible to make the difference in interior pressure between the pressurizing hopper 8 and the molding compartment 30 sufficiently large without need for raising the interior pressure of the pressurizing tank 1 beyond the necessary level. As a result, the use of such an interior pressure for the pressurizing hopper 8 can bring about such merits that the pre-foamed particles 2 can be filled with ease, in a short period of time and with good efficiency in the molding compartment 30 and even if the molding compartment 30 has complex configurations, they can be filled into every corner of the molding compartment 30 without leaving any part of the molding compartment 30 unfilled.

It is however not preferred to compress the particles by an unduly high pressure upon their filling. It has been known to effect the expansion-molding of pre-foamed particles by pressurizing them, filling them in their compressed state in a mold and then molding them in the mold. According to this method, it may be able to solve to an extent the technical drawback which occurs due to the drop of internal pressure of the pre-foamed particles during their molding operation. Pre-foamed particles are filled in the mold in the presence of a foaming agent. Since the particles are compressed and their volumes have thus been reduced, the resulting expansion-molded article will have a higher density (in other words, a lower expansion ratio) compared with an expansion-molded article to be obtained from the same amount of pre-foamed particles in accordance with the pressure-less filling technique. In other words, the above-mentioned pressure filling technique is disadvantageous as it requires, for obtaining an expansion-molded article of the same density (i.e., of the same expansion ratio) as that of an expansion-molded article available from the practice of the pressureless filling technique, pre-foamed particles having a higher expansion ratio compared with the molding method making use of the pressureless filling technique and it thus features poor expansion efficiency. Moreover, it requires high pressure facilities to compress pre-foamed particles and is hence disadvantageous also from the economical viewpoint.

In order to control the compression of the particles to a slight degree, it is effective to fill the particles under pressure in the molding compartment 30 while maintaining fluid vent 31 in the mold 26. The vent can be formed by providing a gap between the mutually contacting portions of the core 28 and cavity 29. A range of 0.8–10.0 mm is preferred as the gap.

When filling under pressure the pre-foamed particles from the pressurizing hopper 8 into the molding compartment 30, the filling pressure may be 0.5–10.0 kg/cm$^2$(G). A filling pressure of 0.7–10.0 kg/cm$^2$(G) may however be preferred for effecting a smooth filling operation without causing the particles to undergo any substantial volume reduction.

Figure 6:
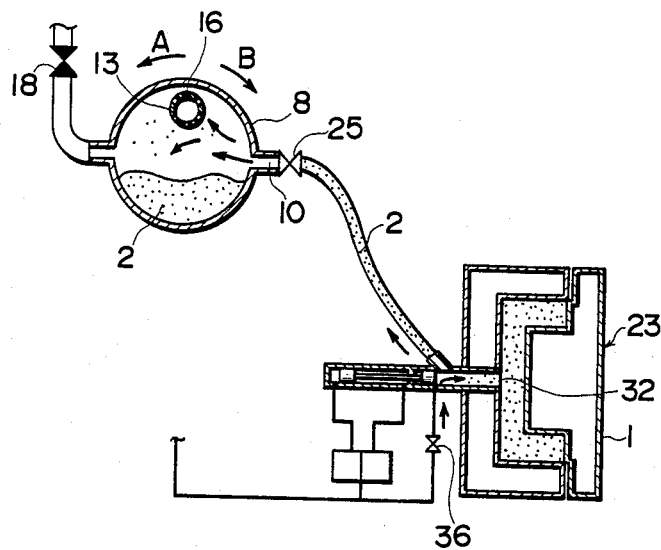
Figure 7:
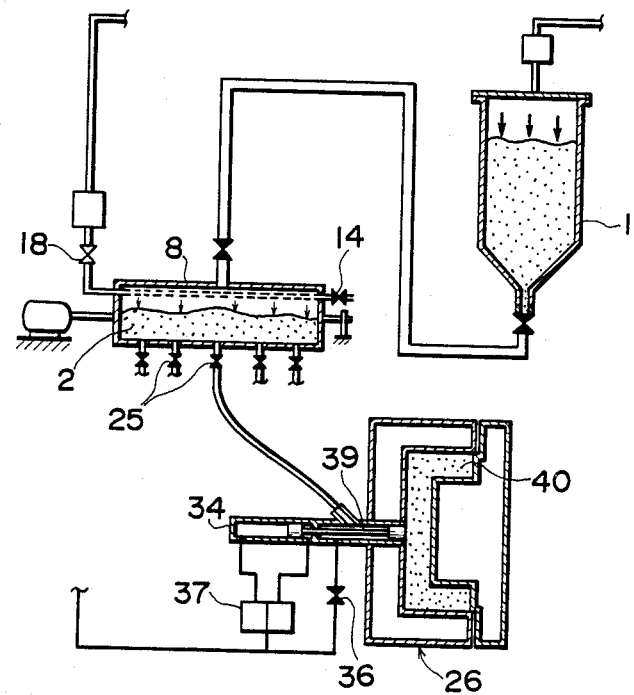

When a predetermined amount of the pre-foamed particles have been filled in the molding compartment 30, the pressurizing valve 18 is closed and the exhaust valve 14 is opened. At the same time, the rotary cylinder 21 is actuated, as illustrated in FIG. 6, to turn the pressurizing hopper 8 over approximately 90° in the direction indicated by the arrow A until the particle outlet 10 of the pressurizing hopper 8 assumes substantially a horizontal position. Accordingly, the pre-foamed particles which have been left over between the particle filling opening 32 and particle outlet 10 are pushed back toward the pressurizing hopper 8. Here, the air present in the pressurizing hopper 8 is exhausted via the minute perforations 16 of the perforated pipe 13 and then through the exhaust valve 14. Furthermore, the directional control valve 37 is actuated to feed compressed air in a direction that the piston rod 39 of the air cylinder 34 is caused to advance. When the particle filling opening 32 of the molding compartment 30 is closed owing to the advancement of the piston rod 39, the pre-foamed particles remaining between the particle filling opening 32 and the particle outlet 10 are in their entirety pushed back to the pressurizing hopper 8 by the compressed air fed through the filling air valve 36. Thereafter, the gate valve 25 for the particle outlet 10 of the pressurizing hopper 8 is closed and the rotary cylinder 21 is actuated to turn the pressurizing hopper 8 in the direction indicated by the arrow B in FIG. 6. The turning motion of the pressurizing hopper 8 is stopped when the particle outlet 8 has returned to its original position.

In the above case, the particle outlet 10 opens in the interior of the pressurizing hopper 8 as shown in FIG. 8 after the pressurizing hopper 8 has been turned in the direction indicated by the arrow A. Since the particle outlet 10 is not closed by the particles held in the pressurizing hopper 8, no load is applied to the particle outlet 10 by the particles held in the pressurizing hopper 8. Therefore, it is possible to recycle smoothly and readily any remaining portion of the particles to the pressurizing hopper 8 after completion of their filling operation.

Needless to say, the angle over which the pressurizing hopper 8 is turnable is not limited to the above-described 90°. This angle can be suitably determined in accordance with the volume of the pressurizing hopper 8 and the amount of pre-foamed particles to be held in the pressurizing hopper 8. The above turnable angle may be of any value so long as the particle outlet 10 can be displaced to a position where the load of the particles present in the pressurizing hopper 8 to the particle outlet 10 is reduced. It is thus not limited to an angle capable of reducing the load to zero (i.e., to an angle by which the particle outlet 10 is brought to a position opening in the interior of the pressurizing hopper 8).

On the other hand, the exhaust valve 14 is closed and the pressurizing valve 18 is opened, thereby holding the remaining pre-foamed particles 2 under pressure in the pressurizing hopper 8. In the meantime, the pre-foamed particles which have been filled in the molding compartment of the mold 26 are heated by heating means such as steam, whreby to cause them to foam and expand fusion-bond to obtain an expansion-molded article 40 conforming with the mold (see, FIG. 7).

FIG. 9 to FIG. 13 illustrate a production apparatus according to another embodiment of this invention.

A pressurizing hopper 58 is composed of a fixed portion 91 and a movable portion 92 which is displaceable up and down relative to the fixed portion 91, so that its internal volume may be changed as desired. Designated at numeral 93 is an internal-volume indicating graduation. By an indicator needle 94 attached to the movable portion 92, the internal-volume indicating graduation is read.

Mesh-like exhaust filters 95, 96 are provided respectively at a lower portion of a gate valve 57 for a particle outlet of the pressurizing tank 51 and at an upper portion of a gate valve 75 for a particle outlet of the pressurizing hopper 58. The positions of the exhaust filters 95, 96 are however not necessarily limited to those illustrated in FIG. 9. The exhaust filter 95 may be provided at any point between the gate valve for the particle outlet of the pressurizing tank 51, whereas the position of the exhaust filter 96 may be chosen at any point between the particle outlet of the pressurizing hopper 59 and the gate valve 75.

Figure 9:
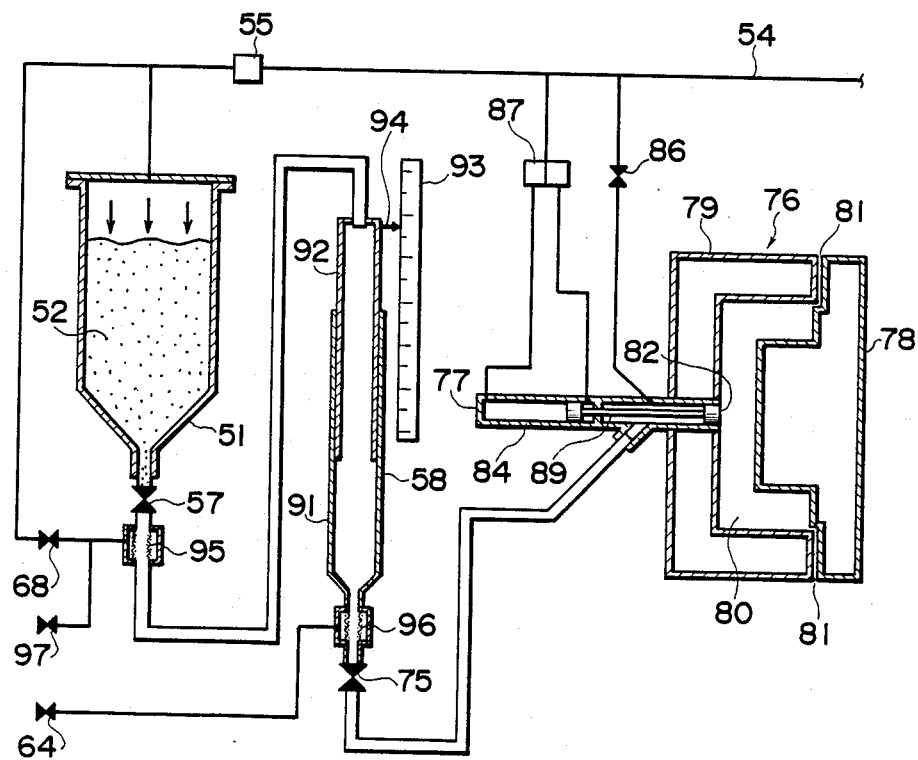
FIG. 9 is a simplified schematic vertical cross-sectional view of an apparatus according to another embodiment of this invention.
Figure 10:
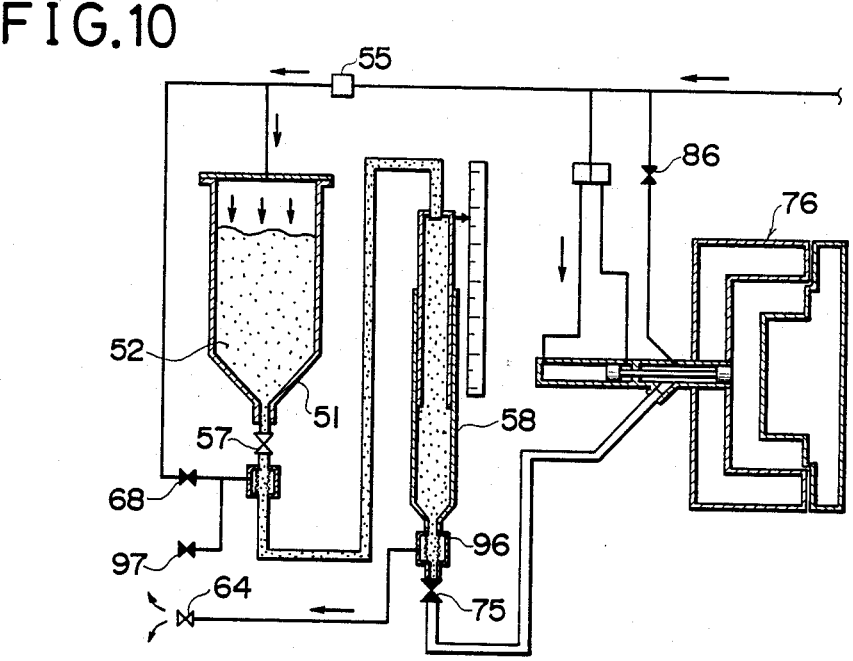
FIGS. 10-13 are simplified schematic vertical cross-sectional views illustrating various steps for producing an expansion-molded article by means of the apparatus shown in FIG. 9.
Figure 11:
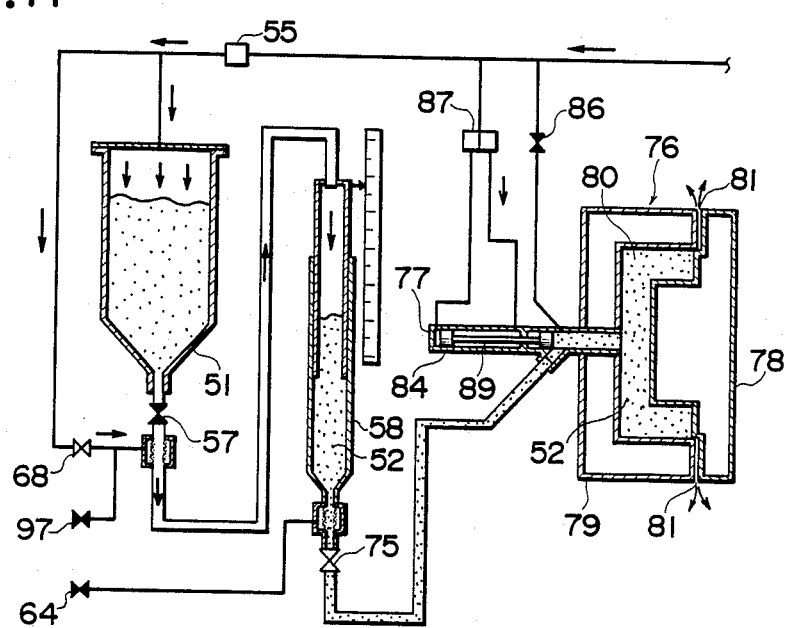
Figure 12:
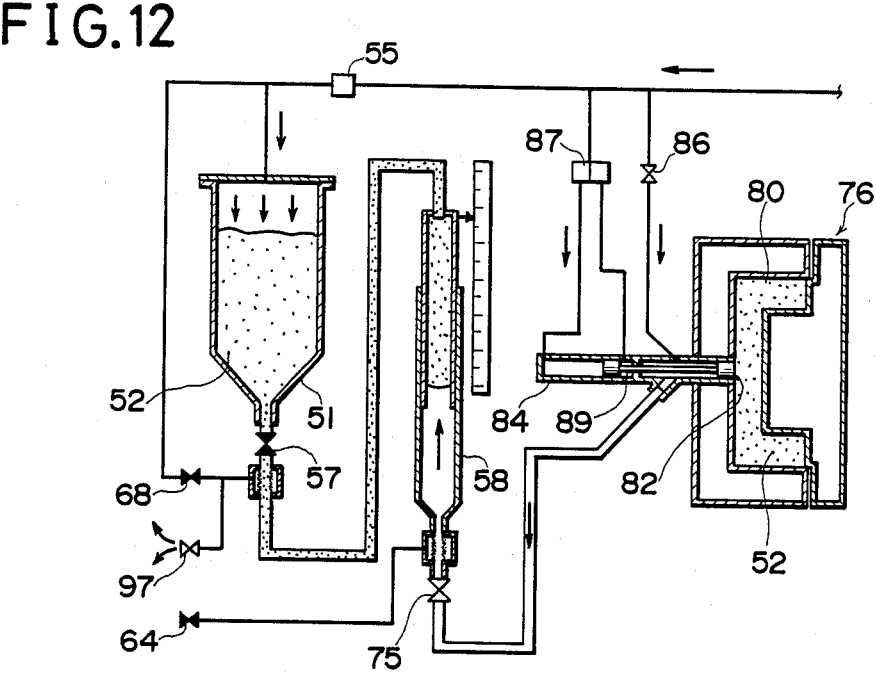
Figure 13:
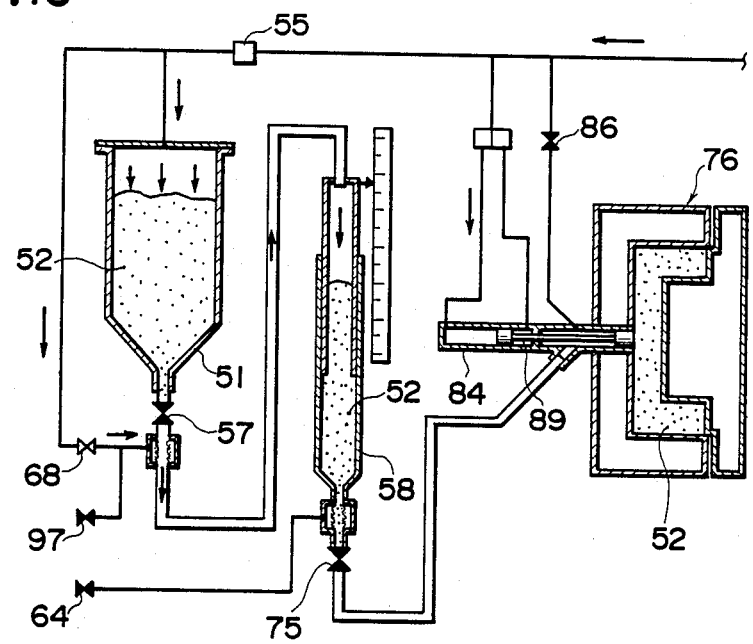

In FIG. 9, compressed air the pressure of which has been adjusted to a predetermined level by a pressurizing regulator 55 connected to a compressed air feed line 54 is fed to the pressurizing tank 51, whereby to keep pre-foamed particles 52 under a predetermined pressure. The vertical position of the movable portion 92 is adjusted in such a way that the pressurizing hopper 58 can have a volume sufficient to hold pre-foamed particles in an amount necessary for several molding operations depending on a molding compartment 80 of a mold 76.

When the gate valve 57 and exhaust valve 64 are opened, the pre-foamed particles 52 are pushed out by the interior pressure of the pressurizing tank 51 from the pressurizing tank 51 and the air present in the pressurizing hopper 58 is exhausted via the mesh-like air filter 96 and then through an exhaust valve 64. Thus, the pre-foamed particles are transferred to the pressurizing hopper 58 (see, FIG. 10). Upon completion of the transfer of the pre-foamed particles to the pressurizing hopper 58, the gate valve 57 and exhaust valves 64 are both closed. Hence, the pre-foamed particles 52 held in the pressurizing hopper 58 are pressurized to a predetermined level by compressed air fed through a pressurizing valve 68.

Thereafter, the directional control valve 87 is actuated to feed compressed air in such a way that a piston rod 89 of an air cylinder 84 of a filling device 77 is retreated. This causes the gate valve 75 and a filling air valve 87 to open. Accordingly, the pre-foamed particles are pushed out of the pressurizing hopper 58 by the compressed air fed through the pressurizing valve 68. Then, the pre-foamed particles are delivered into the molding compartment 80 of the mold 76 by the compressed air supplied through the filling air valve 86 (see, FIG. 11). Here, the air which has been delivered along with the pre-foamed particles to the molding compartment 80 is allowed to escape outside through a cracking 81 provided between a cavity 79 and core 78. Therefore, the pre-foamed particles 52 are filled under pressure in the molding compartment 80 of the mold 76 without reducing the volumes of the pre-foamed particles to any substantial extents.

When the predetermined amount of the pre-foamed particles has been filled in the molding compartment 80, the pressurizing valve 68 is opened and an exhaust value 97 is instead opened. Thus, any remaining pre-foamed particles are pushed back toward the pressurizing hopper 58 by the compressed air supplied through the filling air valve 86. Here, the air present in the pressurizing hopper 58 is exhausted first through the mesh-like exhaust filter 95 provided at the lower portion of the gate valve 57 for the particle outlet of the pressurizing tank 51.

Then, the directional control valve 87 is switched over to feed compressed air in such a way that the piston rod 89 of the air cylinder 84 advances. Thus, the particle filling opening 82 for the molding compartment 80 is closed. Then, any remaining pre-foamed particles are pushed back in their entirety into the pressurizing hopper 58 by the compressed air supplied through the filling air valve 86 (see, FIG. 12). Thereafter, expansion-molding is carried out to obtain a molded article.

On the other hand, the exhaust valve 97, the gate valve 75 for the particle outlet of the pressurizing hopper 58 and the filling air valve 86 are all closed and the pressurizing valve 68 is opened. The remaining pre-foamed particles which have been pushed back to the pressurizing hopper 58 are thus kept under pressure by the compressed air fed through the pressurizing valve 68 until the production of the expansion-molded article is completed (see, FIG. 13).

In the present invention, it may also be feasible to transfer pre-foamed particles in an amount necessary for a single molding operation to the pressurizing hopper 58 instead of transferring pre-foamed particles in an amount sufficient for several molding operations as mentioned in the above embodiment. Whichever transfer method is followed, it is preferred to set the internal volume of the pressurizing hopper 58 at a size somewhat greater than the volume required for holding the thus-transferred pre-foamed particles therein. It is also feasible to hold only the remaining pre-foamed particles, which have been recycled to the pressurizing hopper 58 after completion of their filling in the molding compartment 80, under pressure within the pressurizing hopper 58 while the molding of the thus-filled pre-foamed particles is carried out. Alternatively, additional pre-foamed particles in an amount equivalent to those consumed for the molding operation may be fed from the pressurizing tank 51 to the pressurizing hopper 58 and both of the thus-recycled remaining pre-foamed particles and the additional pre-foamed particles may then be held under pressure in the pressurizing hopper 58.

Figure 14:
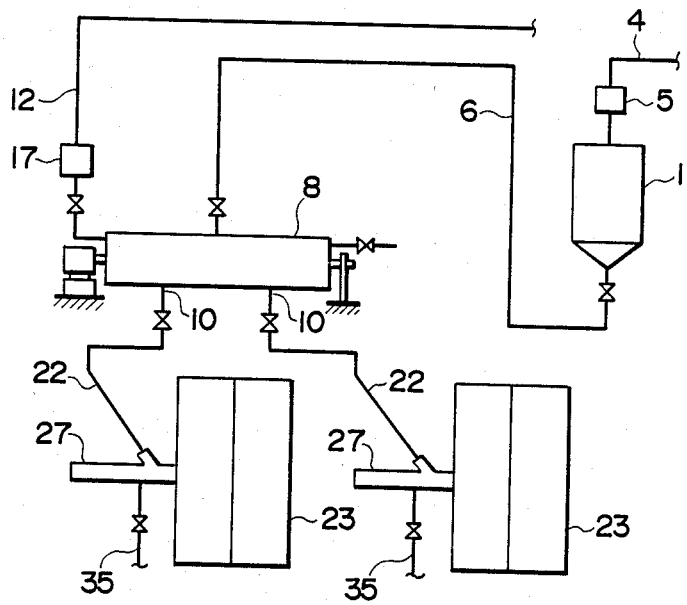
FIG. 14 is a flow diagram showing production of expansion-molded articles by means of a plurality of molding machines connected to a single pressurizing hoppers.

The present invention is however not limited to the combination of a single pressurizing hopper equipped with one or more particle outlets and a single molding machine. When the pressurizing hopper is formed for example with an internal volume sufficient to hold particles in an amount sufficient for several operations, it may be feasible, as shown in FIG. 14, to provide a plurality of particle outlets 10 with the pressurizing hopper and a plurality of molding machines 23, the number of which is the same as that of the particle outlets 10, and to connect the particle outlets 10 respectively with the molding machines 23 by way of their corresponding feed lines 22. By constructing the production machine in the above manner, a plurality of molding operations can be performed either concurrently or continuously one after another.

Figure 15:
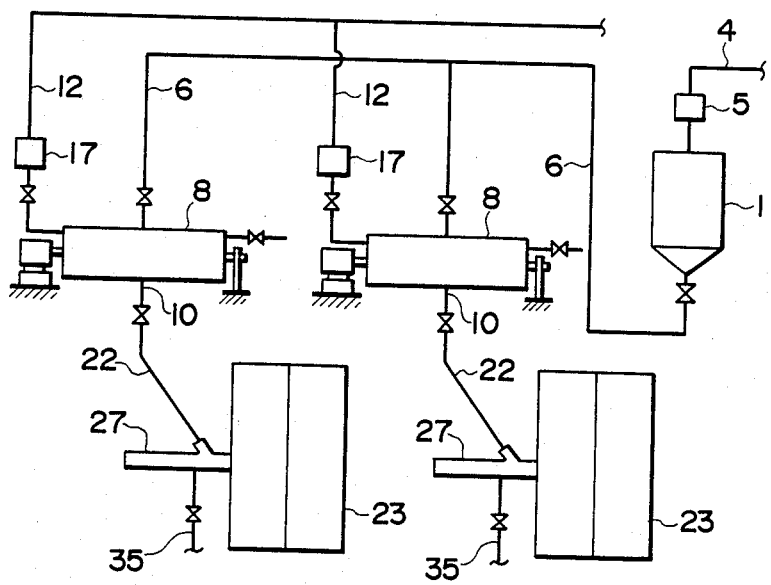
FIG. 15 is a flow diagram illustrating production of expansion-molded articles by means of a plurality of molding machines connected respectively to their corresponding pressurizing hoppers.

Furthermore, the present invention is not necessarily limited to the use of a single pressurizing hopper. As illustrated in FIG. 15, a plurality of pressurizing hoppers may be provided and a molding machine may be connected to each of the pressurizing hoppers. This arrangement enables molding operations the either concurrently or continuously one after another.

The present invention will next be described in further detail by the following specific Examples performed at room temperature.

EXAMPLES 1–4

Using the apparatus shown in FIG. 9, the pre-foamed particles shown in Table 1 were subjected to a pressure treatment with air in the pressurizing tank to apply to them the internal pressure, also given in Table 1. Then, the pre-foamed particles in the pressurizing tank were held under the pressure given in Table 1.

Thereafter, the pre-foamed particles were transferred from the pressurizing tank to the pressurizing hopper, in which they were pressurized under the same pressure as in the pressurizing tank. The pre-foamed particles were then filled under the pressure given in Table 1 in a mold having internal dimensions of 300 mm×300 mm×50 mm and provided with a cracking of 3 mm wide. Pre-foamed particles which had been left over after completion of the filling in the mold were pushed back into the pressurizing hopper, in which they were held under the same pressure as the interior pressure of the pressurizing tank until completion of the molding. The internal volume of the pressurizing hopper was set at a size sufficient to hold pre-foamed particles in an amount necessary for 5 molding operations. For heating the pre-foamed particles in the molding compartment, steam of 3.2 kg/cm$^2$(G) was employed. Fifteen molding operations were conducted continuously to obtain 15 pieces of expansion-molded articles. The surface conditions, average shrinkage factors and dimensional variations of surfaces of the fifteen expansion-molded articles were measured. Measurement results are shown in Table 1.

COMPARATIVE EXAMPLES 1–4

In order to obtain objective comparison between the articles produced under the prior art and articles produced in accordance with the present application the following comparisons as set forth in table 1 were performed.

Pre-expanded particles, which had been subjected to a pressure treatment and applied with an internal pressure in the same manner as in the above examples, were taken from the pressurizing tank under atmospheric pressure in an amount necessary for 5 molding operations. They were held in a hopper under atmospheric pressure. From the hopper the pre-foamed particles were filled in the same mold as that used in Examples 1–4, followed by their molding with steam of 3.2 kg/cm$^2$(G). Fifteen pieces of expansion-molded articles were obtained in each of the comparative Examples. The pre-foamed particles in the filling hopper were held under atmospheric pressure until the molding operations were completed. The surface conditions, average shrinkage factors and dimensional variations of surfaces of the fifteen expansion-molded articles were measured. Measurement results are also shown in Table 1.

EXAMPLES 5–8

In each of the Examples, fifteen pieces of molded containers were obtained in the same manner as in Examples 1–4, using pre-foamed particles given in Table 1 which had been subjected to a pressure treatment with air in the pressurizing tank and applied with an internal pressure, employing as a mold for containers having an internal opening diameter of 90 mm and a depth of 105 mm, using steam of 5 kg/cm$^2$(G) for heating, and setting the interior pressure of the pressurizing tank and the filling pressure respectively at the values given in Table 2. Properties of these containers were measured. Measurement results are summarized in Table 2.

COMPARATIVE EXAMPLES 5–8

Pre-foamed particles, which had been subjected to a pressure treatment and applied with an internal pressure in Examples 5–8, were taken out under atmospheric pressure from the pressurizing tank. A portion of the pre-foamed particles which portion was sufficient for five molding operations was held in a hopper of an open structure and was then filled in the same mold container molding as used in Example 5–8 in the same manner as in Comparative Examples 1–4. They were heated with steam of 5 kg/cm$^2$(G) to achieve their molding. Fifteen containers were obtained in each of the comparative examples. Properties of the thus-obtained containers were measured. Measurement results are also summarized in Table 2.

TABLE 1

| | Pre-expanded particles | | | | Expansion-molded article | | | |
|---|---|---|---|---|---|---|---|---|
| | Base resin | Particle diameter (mm) | Internal pressure after pressure treatment (kg/cm$^2$·G) | Internal pressure in pressurizing tank (kg/cm$^2$·G) | Filling pressure (kg/cm$^2$·G) | Expansion ratio (times) | Average shrinkage factor (1) (%) | Dimensional variation (2) | Overall evaluation |
| Example | | | | | | | | | |
| 1 | Ethylene-propylene random copolymer | 6–7 | 1.5 | 2.0 | 2.0 | 30 | 1.4 | 0.59 | O |
| 2 | Ethylene-propylene random copolymer | 4.5–5 | 1.2 | 2.0 | 1.0 | 30 | 1.8 | 1.11 | O |
| 3 | Ethylene-propylene random copolymer | 5–6 | 1.3 | 1.3 | 0.8 | 15 | 1.2 | 0.45 | O |
| 4 | Ethylene-propylene random copolymer | 5–6 | 1.2 | 2.0 | 2.0 | 45 | 1.8 | 0.85 | O |
| Comparative Example | | | | | | | | | |
| 1 | The same as Example 1 | | | | — | 30 | 2.2 | 2.24 | X |
| 2 | The same as Example 2 | | | | — | 30 | 2.3 | 2.38 | X |
| 3 | The same as Example 3 | | | | — | 15 | 1.4 | 1.85 | X |
| 4 | The same as Example 4 | | | | — | 45 | 2.5 | 2.03 | X |

TABLE 2

| | Pre-expanded particles | | | | Expansion-molded article (Container) | | | | |
|---|---|---|---|---|---|---|---|---|---|
| | Base resin | Particle diameter (mm) | Internal pressure after pressure treatment (kg/cm$^2$·G) | Internal pressure in pressurizing tank (kg/cm$^2$·G) | Filling pressure (kg/cm$^2$·G) | Expansion ratio (times) | Thickness (mm) | Fusion bondability of particles (3) | Surface conditions (4) | Overall evaluation |
| Example | | | | | | | | | | |
| 5 | Ethylene-propylene random copolymer | 0.8–1.3 | 5.0 | 5.0 | 5.0 | 7.6 | 2.7 | O | O | O |
| 6 | Ethylene-propylene random copolymer | 0.8–1.4 | 3.5 | 5.0 | 7.0 | 8.3 | 3.2 | O | O | O |
| 7 | Ethylene-propylene random copolymer | 1.3–1.6 | 3.5 | 5.0 | 3.0 | 10.2 | 3.2 | O | O | O |
| 8 | Ethylene-propylene random copolymer | 1.3–1.6 | 2.5 | 5.0 | 0.8 | 10.2 | 3.3 | O | O | O |
| Comparative Example | | | | | | | | | | |
| 5 | The same as Example 5 | | | | — | 7.6 | 2.7 | Δ | Δ | X |
| 6 | The same as Example 6 | | | | — | 8.3 | 3.2 | Δ | X | X |
| 7 | The same as Example 7 | | | | — | 10.2 | 3.2 | Δ | X | X |
| 8 | The same as Example 8 | | | | — | 10.2 | 3.2 | X | X | X |

Note:
(1) The average of shrinkage factors of fifteen expansion-molded articles along the surface of the mold.
(2) Determined by measuring the dimensions of the surfaces of fifteen expansion-molded articles and expressed as standard deviation ($\sigma_{n-1}$) of the dimensions for the average of the measured values.
(3) Parts of fifteen containers were bent to rupture them. The rupture cross-sections of the fragments were observed
The observation results were evaluated under the following standard:
O ... No interparticle cut-off. Samples containing ruptured particles: less than 10%
Δ ... Samples containing interparticle cut-off: 25–10%
X ... Samples containing interparticle cut-off: over 25%
(4) The surfaces of fifteen expansion-molded articles were observed. The observation results were evaluated
under the following standards:
O ... The entire surfaces were smooth. They contained extremely little ruggedness.
Δ ... Samples containing somewhat large surface ruggedness: 25–10%
X ... Samples having poor surface smoothness and extremely large ruggedness: over 25%.

When the method of this invention is practiced using the production apparatus shown in FIG. 9 instead of that illustrated in FIG. 1, it is also possible to exhibit the same advantageous effects as those achieved in the above Examples which were carried out using the production apparatus shown in FIG. 9, and hence to provide expansion-molded articles which are excellent in both properties and quality. Compared with the production apparatus depicted in FIG. 9, the production apparatus shown in FIG. 1 has a merit that after completion of filling particles in a mold, any remaining particles can be recycled readily and smoothly.

Having now fully described the invention, it will be apparent to one of ordinary skill in the art that many changes or modifications can be made thereto without departing from the spirit or scope of the invention as set forth herein.

We claim:

1. A method for producing an expansion-molded article from internally pressurized pre-foamed particles of a thermoplastic resin which comprises:
   maintaining a supply of said internally pressurized pre-foamed particles under pressure in a pressurizing tank;
   transferring a suitable portion of said pre-foamed particles, under pressure, to a pressurizing hopper and holding the transferred particles under pressure in said pressurizing hopper;

feeding under pressure into a mold a predetermined amount of the pre-foamed particles from the pressurizing hopper; and heating the thus-filled pre-foamed particles within the mold so as to cause the pre-foamed particles to foam and expand, thereby fusion-bonding the resulting expanded particles to obtain the expansion-molded article.

2. The method of claim 1 wherein the internal pressures of the pressurizing tank and pressurizing hopper are each maintained at from 0.2 to 20 kg/cm$^2$(G) and the filling pressure upon filling the pre-foamed particles into the mold ranges from 0.5 to 10.0 kg/cm$^2$(G).

3. The method of claim 1 wherein the step of maintaining a supply of the pre-foamed particles under pressure in a pressurizing tank comprises gradually pressurizing the pressurizing tank at a pressure-raising velocity of 0.015–0.5 kg/cm$^2$(G)/hr.

4. The method of claim 1 wherein the step of holding the transferred pre-foamed particles under pressure in the pressurizing hopper comprises connecting the pressurizing tank to the pressurizing hopper via a particle transfer line.

5. The method of claim 2 which comprises maintaining the internal pressure of the pressurizing hopper at the same level as the internal pressure of the pressurizing tank or at a pressure higher by 0.01–1.0 kg/cm$^2$ than the internal pressure of the pressurizing tank.

6. The method of claim 1 which further comprises, after the step of filling the pre-foamed particles in the mold, recycling any remaining portion of pre-foamed particles to the pressurizing hopper and maintaining said recycled portion under pressure.

7. The method of claim 1 wherein the pre-foamed particles are transferred under pressure from the pressurizing hopper to a mold which allows fluid to escape therefrom under conditions which do not result in a substantial volume reduction of the thus-filled pre-foamed particles.

8. The method of claim 7 wherein said mold comprises a core and a cavity having mutually-contacting portions and which comprises providing a gap of from about 0.8 to 10.0 mm between the mutually-contacting portions to allow fluid to escape therefrom.

9. The method of claim 7 wherein the step of filling the pre-foamed particles into the mold is carried out at a filling pressure of from 0.5 to 10.0 kg/cm$^2$(G).

10. An apparatus suitable for use in the production of an expansion-molded article from internally pressurized pre-foamed particles comprising a thermoplastic resin, said apparatus comprising:

a pressurizing tank having an internal volume capable of storing therein under pressure a quantity of said pre-foamed particles sufficient to form at least one of said expansion-molded article, said pressurizing tank including a particle outlet;

a pressure feed system for pressurizing the interior of said pressurizing tank under a pressure sufficient to apply a predetermined internal pressure to said pre-foamed particles;

at least one pressurizing hopper including a particle inlet and a particle outlet and capable of holding a suitable portion of said particles sufficient to form said expansion-molded article;

a gate mechanism for opening or closing the particle outlet of said at least one pressurizing hopper;

particle transfer means for transferring said suitable portion of particles in a pressurized state from said pressurizing tank through the particle outlet thereof to said at least one pressurizing hopper through the particle inlet thereof;

at least one molding machine having a molding compartment for receiving said suitable portion of particles through a particle filling opening, and further including heating means for heating the particles within the molding compartment to cause the heated particles to expand and fuse to form said expansion-molded article; and a particle filling system for causing the particles to flow out from the pressurizing hopper through the particle outlet thereof and for filling the particles into the molding compartment through said particle filling opening thereof, while maintaining the particles under pressure.

11. The apparatus of claim 10 which further comprises a particle transfer line connecting the particle outlet of the pressurizing tank and said at least one pressurizing hopper; each of said at least one molding machine including a particle feed opening in communication with the particle filling opening; and a particle feed line connecting the particle outlet of each said pressurizing hopper and the particle feed opening of each said molding machine, whereby transfer of the pre-foamed particles from each said pressusrizing hopper and the filling of same in the molding compartment of each said molding machine are effected through said particle transfer line and particle feed line, respectively.

12. The apparatus of claim 11 wherein each said pressurizing hopper is provided with a plurality of particle outlets, said plurality of outlets being connected to one or more of said molding machines.

13. The apparatus of claim 11 which comprises a plurality of said pressurizing hoppers, each of which being connected to at least one of said molding machines.

14. The apparatus of claim 10 which further comprises within each said pressurizing hopper a perforated pipe, the perforations of which are at least 40 mesh, a pressure feed line connected to one end of the perforated pipe for introducing pressurized gas into the interior of the pressurizing hopper, and an exhaust line connected to the other end of said perforated pipe for reducing the interior pressure of the pressurizing hopper.

15. The apparatus of claim 10 which further comprises means for turning each said pressurizing hopper for displacing the particle outlet of said pressurizing hopper to a position where the load of pre-foamed particles in the pressurizing hopper to the particle outlet of the pressurizing hopper is reduced, thereby facilitating recycling of any unused portion of the pre-foamed particles after completion of the filling of the particles in the molding compartment to the pressurizing hopper.

16. The apparatus of claim 10 wherein each said pressurizing hopper has a variable internal volume and being composed of a fixed portion and a moveable portion with the moveable portion being displaceable relative to the fixed portion, and further comprising graduation means for indicating the volume of pre-foamed particles held therein.

17. The apparatus of claim 16 which further comprises a gate mechanism for opening and closing the particle outlet of each said pressurizing tank.

18. The apparatus of claim 17 which further comprises a first mesh-like exhaust filter provided between the gate mechanism for each said pressurizing tank and the particle inlet of each said pressurizing hopper, and a second mesh-like exhaust filter between the particle outlet of each said pressurizing hopper and the gate mechanism of each said pressurizing hopper.

* * * * *

UNITED STATES PATENT AND TRADEMARK OFFICE
CERTIFICATE OF CORRECTION

PATENT NO. : 4,822,542

DATED : April 18, 1989

INVENTOR(S) : Hideki Kuwabara, et al

It is certified that error appears in the above-identified patent and that said Letters Patent is hereby corrected as shown below:

On the title page under "Inventors", change the name of the first inventor from "Hedeki Kuwabara" to read -- Hideki Kuwabara --.

Column 16, claim 11, line 22, "pressusrizing" should read -- pressurizing --.

Signed and Sealed this
Sixteenth Day of January, 1990

*Attest:*

JEFFREY M. SAMUELS

*Attesting Officer*  *Acting Commissioner of Patents and Trademarks*